B. A. WALRATH.
GEAR SHIFTING MECHANISM.
APPLICATION FILED OCT. 12, 1914.

1,239,436.

Patented Sept. 4, 1917.
4 SHEETS—SHEET 1.

Witnesses

Inventor
B. A. WALRATH
By Milton S. Crandall
Attorney

B. A. WALRATH.
GEAR SHIFTING MECHANISM.
APPLICATION FILED OCT. 12, 1914.
1,239,436.
Patented Sept. 4, 1917.
4 SHEETS—SHEET 2.
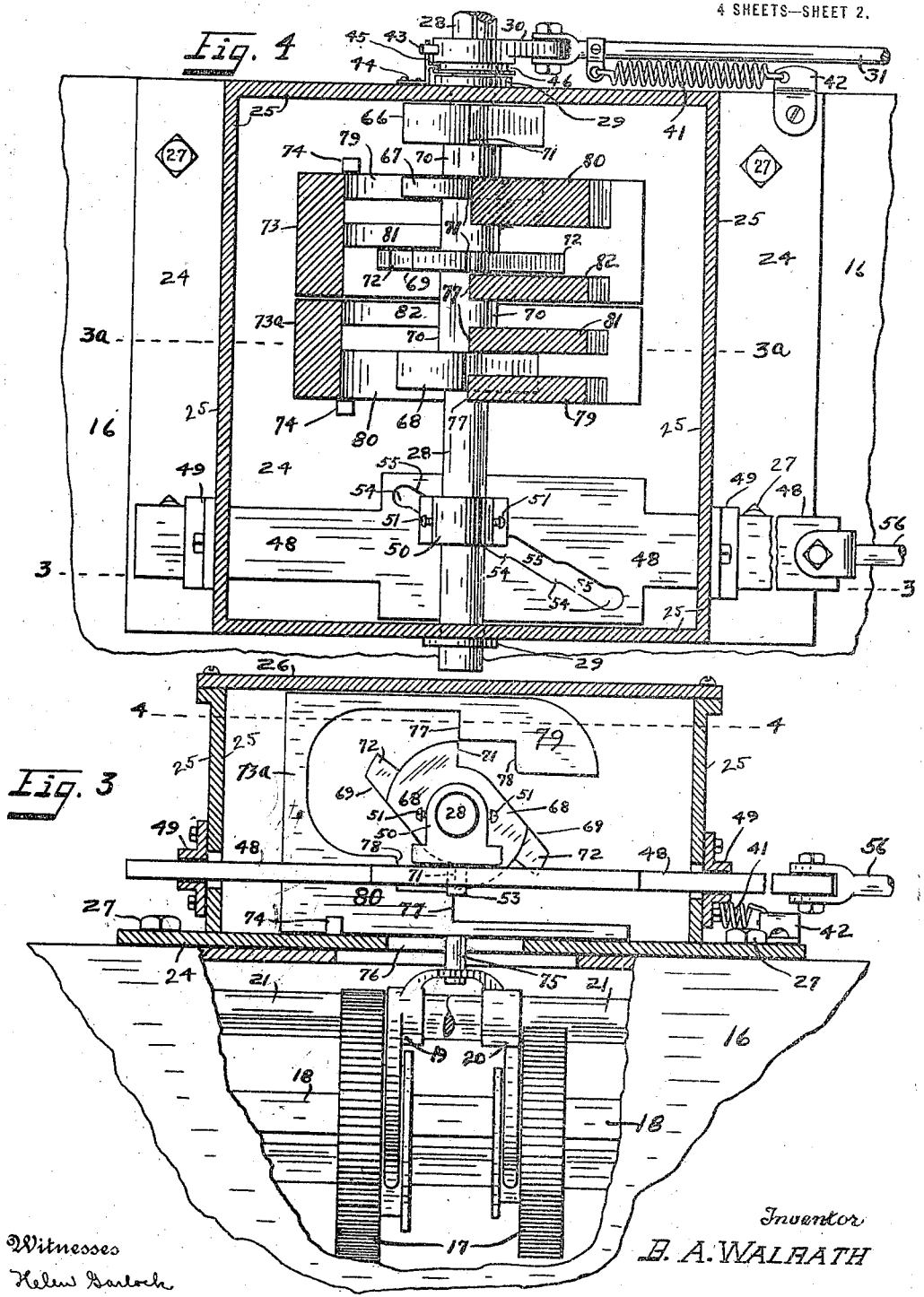

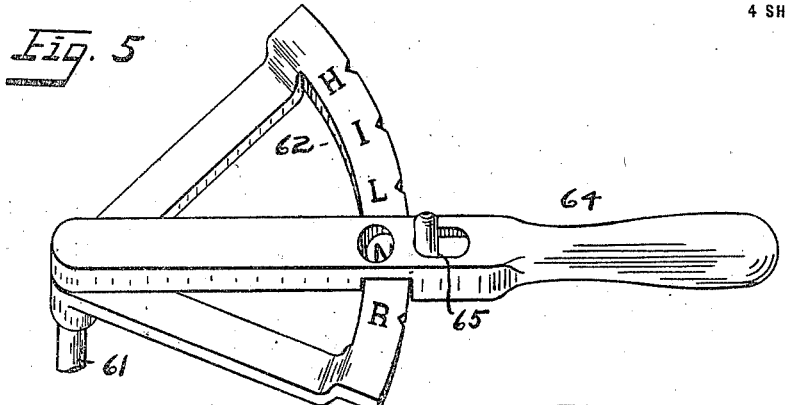
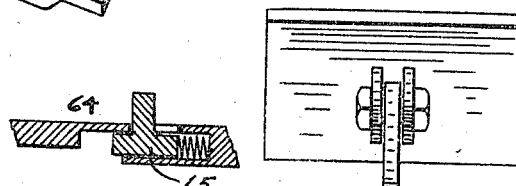
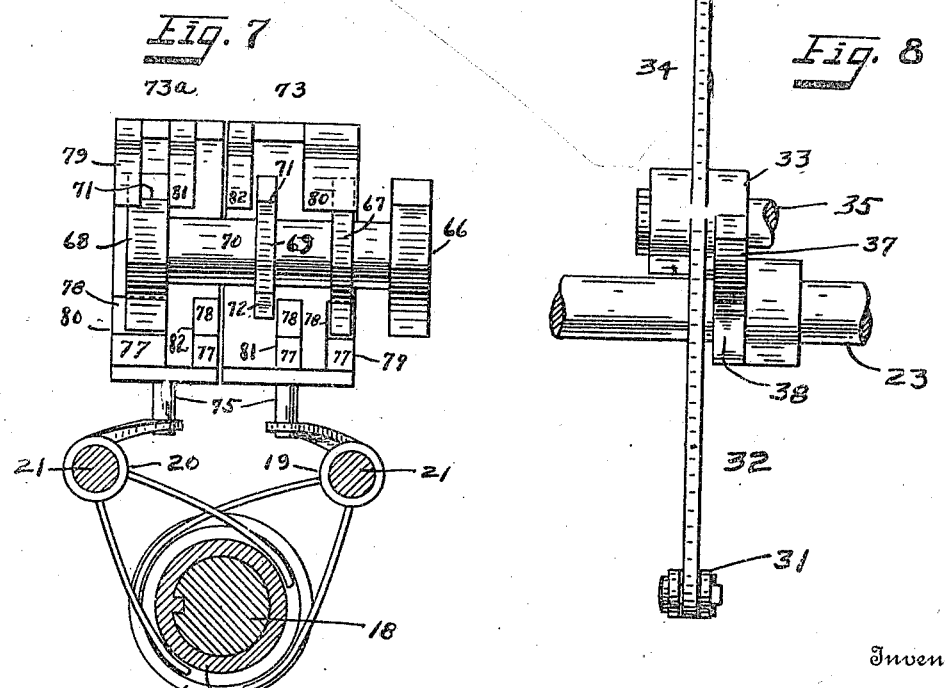
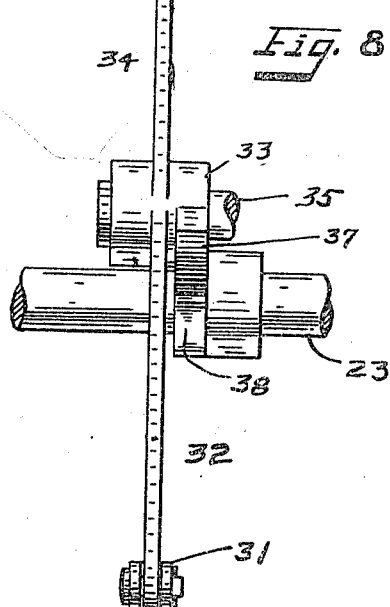

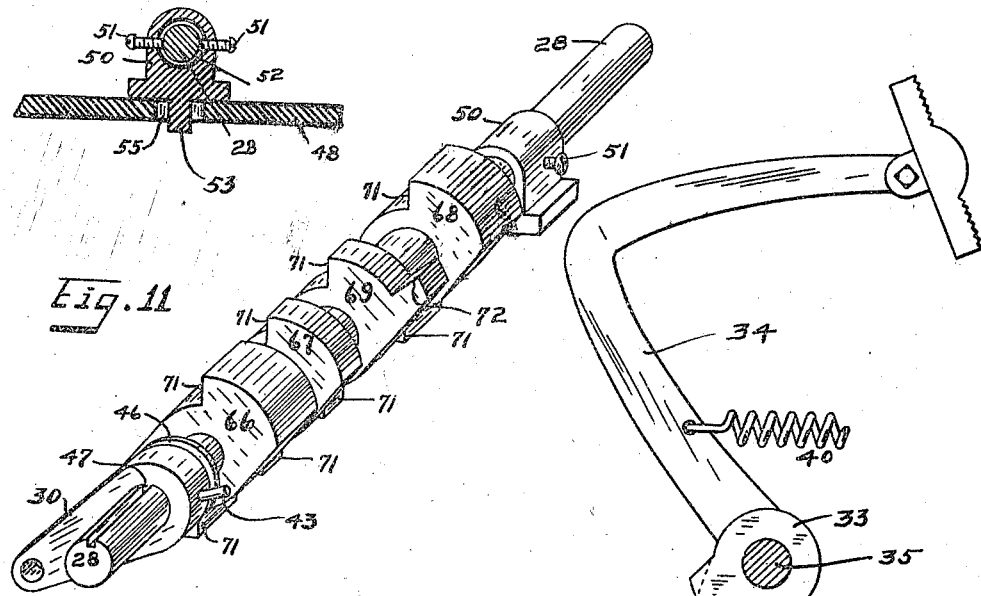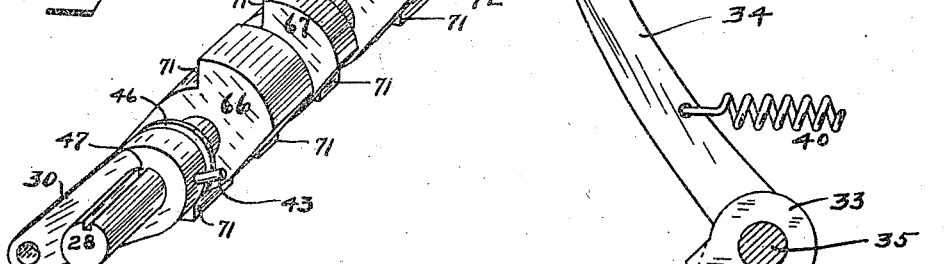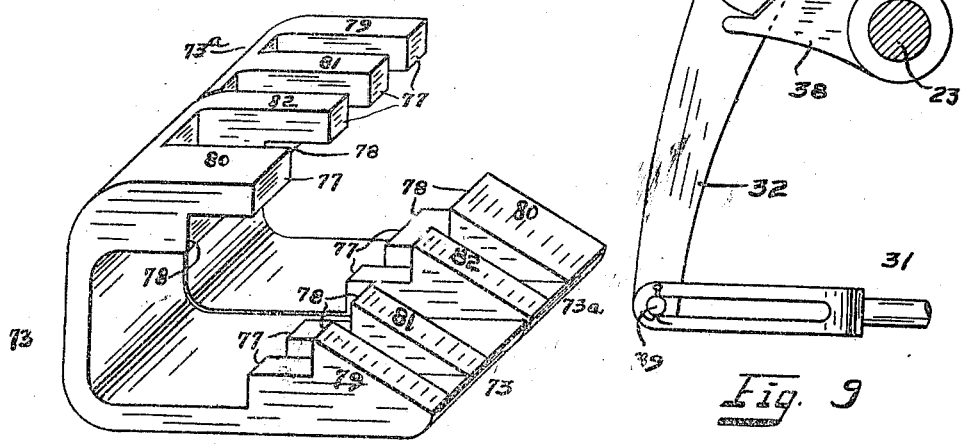

UNITED STATES PATENT OFFICE.

BURTON A. WALRATH, OF ROCK VALLEY, IOWA.

GEAR-SHIFTING MECHANISM.

1,239,436.     Specification of Letters Patent.     Patented Sept. 4, 1917.

Application filed October 12, 1914. Serial No. 866,331.

*To all whom it may concern:*

Be it known that I, BURTON A. WALRATH, a citizen of the United States, and a resident of Rock Valley, in the county of Sioux and State of Iowa, have invented certain new and useful Improvements in Gear-Shifting Mechanism, of which the following is a specification.

The present invention relates to means for controlling the power transmission of motor-driven vehicles.

In the structure presented in my copending application, Serial Number 824,456, filed March 13, 1914, cam and yoke mechanism, actuated by the clutch-controlling means, is employed to shift the change-gears into and out of operative relation with the main-shaft. The cams and yokes disclosed, however, are of comparatively great weight and size; and, owing to the particular types of cams and yokes employed, considerable power is lost due to friction.

The primary object, therefore, of the present invention, is the improvement of the general construction presented in the concurrent application.

A further object of the invention is the construction of an improved mechanical gear-shifting device, which may be conveniently mounted upon the usual transmission case.

A still further object is the production of a device of this class, wherein the weight, size and cost of production and installation are reduced to the minimum.

Furthermore, the invention contemplates a novel foot-lever control which actuates both the shifting mechanism and the clutch-lever shaft. Although the shifting mechanism may in some cases be operated directly from the usual clutch-lever, in many cases this is impracticable, as when the stroke of the clutch-lever is insufficient for control of the gear-shifting members. The control which I employ, however, is so designed as to permit of a long stroke of the foot-lever, the first slight movement of which withdraws and holds the clutch in disengagement while the stroke is completed to shift the gears.

The invention consisting of the construction, combination and novel arrangement of parts, will be fully understood from the following description, reference being had to the accompanying drawings, which form a part of this application, and in which like characters of reference indicate corresponding parts throughout the several views, of which,—

Figure 2:
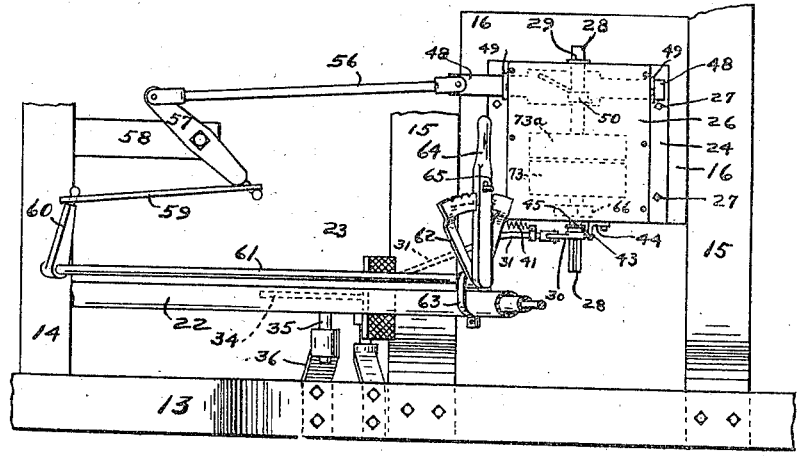
Figure 1:
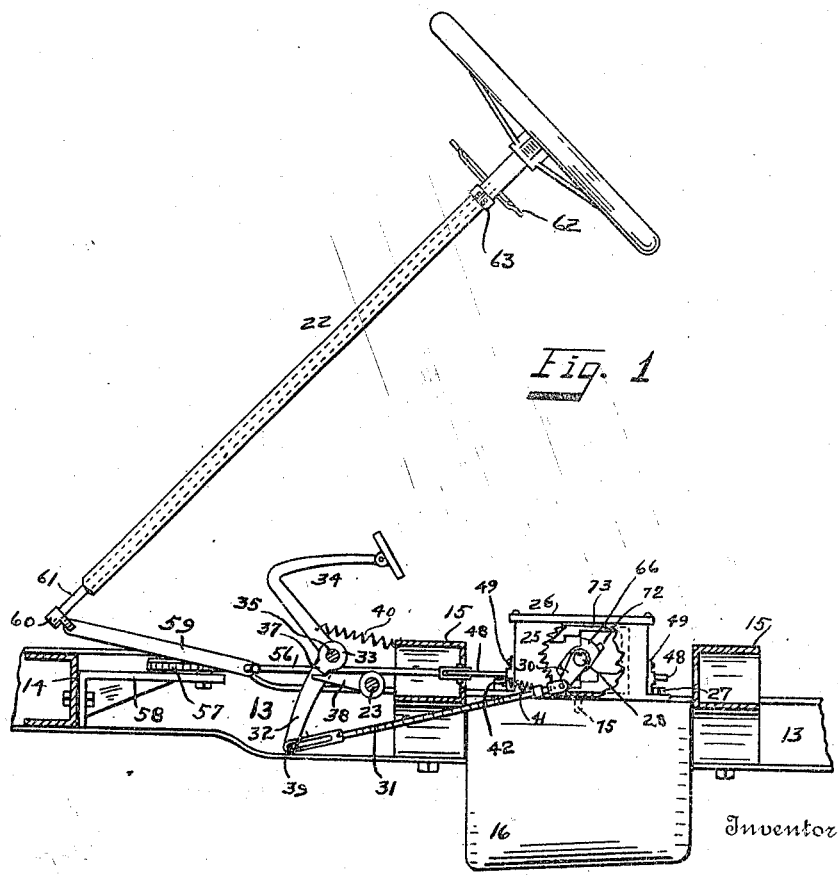

Figure 1 is a fragmentary side elevation of an automobile chassis, equipped with the device of my invention; Fig. 2 is a plan of the same; Fig. 3 is an enlarged elevation of the gear-shifting members, the sides and bottom of the case being taken in section upon the lines, 3 and 3ª, respectively of Fig. 4, and the gear-case being shown in part; Fig. 4 is a horizontal section of the same taken upon the line 4 of Fig. 3, the cam-shaft being broken off at one end; Fig. 5 is a perspective view of the selector lever and quadrant; Fig. 6 is a fragmentary longitudinal section of the selector lever; Fig. 7 is a front elevation of the yokes, cams, and change-gears, the latter being shown in section; Fig. 8 is a front elevation of the foot-lever and members associated therewith; Fig. 9 is a side elevation of the same; Fig. 10 is a vertical section of the cam-shaft swivel and parts associated therewith; Fig. 11 is a perspective view of the cam-shaft; and Fig. 12 is a similar view of a modification of the yokes.

Referring, now, to the illustrations, 13 represents the side members of the chassis and 14 and 15 the intermediate cross-members. Between the cross-members, 15 is mounted the usual transmission case, 16, inclosing the change-gears, 17, (Fig. 3), each slidably keyed upon the counter shaft, 18, and movable to neutral and operative positions on opposite sides of neutral as by radial shifting-arms, 19 and 20, slidably-mounted upon parallel guide shafts, 21. The steering column is represented at 22 and the clutch-lever-shaft at 23.

The fragmentary structure above-defined represents no part of the present invention, but serves to illustrate the familiar parts of an automobile with which the device of my invention may be applied.

To simplify the description we will assume that forward and rearward movement of the armed collar 19, respectively places the reverse and low gears in operative relation with the main-shaft; and that similar movements of the armed collar, 20, actuate the intermediate and high gears.

The gear-shifting mechanism may be supported in any suitable manner, but preferably is inclosed by a rectangular box having a bottom, 24, front, rear and side walls, 25 and a top, 26. In the present embodiment this case is mounted upon the gear-box and is secured thereto by cap-screws, 27.

28 is a shaft journaled for rotation and longitudinal movement in bearings, 29, formed integrally with the side walls of the case. Upon the said shaft is mounted a crank-arm, 30, outside the case and connected by a rod, 31, with a lever arm, 32, depending from a hub, 33, formed integrally with a foot-lever, 34, and mounted upon a short shaft 35, carried by a bracket, 36, mounted upon the chassis. The said hub is formed with a cam, 37, adapted to engage the inclined end of a short lever, 38, secured to the clutch-lever-shaft and which supplants the usual clutch-lever. The forward end of the connecting-rod 31 is provided with a longitudinal slot, inclosing the wrist-pin 39 of the lever-arm 32.

By virtue of this construction when the foot-lever is depressed the cam 37 will coact with the clutch-lever 38 to withdraw the clutch and hold the same disengaged while the stroke of the foot-lever is continued to actuate the gear-shifting members.

A spring 40, secured to the foot-lever and main frame serves to retract the former when released. The shaft, 28, is retracted by a spring, 41, secured at one end to an ear, 42, mounted on the case, and at the opposite end to the connecting-rod 31. The crank 30 is provided with a stop stud, 43, which normally engages a bracket, 44, mounted upon the side of the case and having a lug 45 engaging an annular groove 46 in the hub of the crank, whereby displacement of the latter is prevented. The shaft 28 is movable longitudinally through the crank upon a key or feather, 47.

Within the case is an elongated plate, 48, movable transversely to the shaft 28, and having its end portions reduced and slidably protruding through bearings, 49, mounted on opposite sides of the case.

The shaft 28 is encircled by a swivel collar, 50, in opposite sides of which are set-screws, 51, which freely engage an annular groove, 52, in the shaft, (Fig. 10.) The swivel is formed with a flat base which rests upon the selector-plate, 48, and is provided with a depending lug, 53, inclosed by a diagonal slot in the selector-plate, whereby movement of the latter imparts longitudinal movement to the shaft. The said slot, as in my former application, preferably consists of a series of short slots, 54, disposed laterally to the shaft and alined diagonally thereto, each of said slots communicating with its neighbor by a diagonal slot, 55.

The forward end of the selector-plate is connected by a rod 56, with one end of a lever 57, fulcrumed upon a bracket, 58, mounted upon the chassis. The opposite end of said lever is connected by a rod 59 with a crank-arm 60, carried upon the lower end of a shaft, 61, mounted parallel with the steering column and free to turn within the hub of a quadrant, 62, secured by a band, 63, or otherwise, upon the steering-post.

The shaft 61 is provided with a hand-lever, 64, having a pawl, 65, adapted to yieldably engage the quadrant notches, labeled, R, N, L, I, and H, which characters represent the respective speed ratios.

The shaft 28 carries cams, 66, 67, 68 and 69, preferably all cast integrally with a common hub, 70, and normally inclined at an angle of about 45 degrees. Said cams are generally oblong in side elevation and have diagonally-opposite corners formed with shoulders affording oppositely faced radial edges, 71, substantially vertically disposed, respecting the normal position of the cams.

The first three of the above-mentioned cams act to place the gears in neutral, while the cam 69, positioned intermediate cams 67 and 68, serves to shift the gears to operative positions. The shifting cam may be identical with its companions but its corners opposite from the shoulders 71 are formed with lugs, 72, the inner edges of which are radially disposed and spaced from the shoulders 71 not less than the distance the gears are shifted between neutral and operative positions. The presence of the shoulders, 71, upon the shifting cam, however, is arbitrary, as will presently appear.

The cam-shaft is centrally inclosed by yokes 73 and 73ª, mounted side by side to move laterally to the cam-shaft between suitable guides, as the studs 74 on the bottom 24 of the case. From the yokes depend center-bolts, 75, free to move within slots, 76, (Fig. 3), in the bottom of the case; and engaged with the gear-shifting arms, 19 and 20, respectively.

The arms of the yokes are each formed with a plurality of blocks, the blocks of each arm being in horizontal alinement and oppositely disposed to those of the opposite arm. The inner sides of the blocks are each formed with two steps, 77 and 78, successively arranged and oppositely faced to those of the opposite side of the yoke. The faces of the steps 77 are alined vertically and normally are in alinement with the axis of the cam-shaft. The shifting-cam 69 coacts with the shoulders 77; and the neutralizing cams with the shoulders, 78. The blocks of each arm are arranged in spaced relation and those with which the shifting-cam coöperates are offset with respect to their companions on the opposite arm of the yoke, which permits engagement with one and passage of the other.

Referring, now, more particularly to Fig. 4, the lower arm of the yoke 73 has, adjacent its outer edge one of these blocks 79 and an intermediate block 81; and the upper arm is provided with an inner block 82 and a comparatively wider block 80, directly opposite the block 79 and the space intermediate the latter and the block 81.

The yokes may be identical in design, excepting that the blocks of the yoke 73ª are transposed; that is, the blocks 80 and 82 are located adjacent the outer and inner edges respectively of the lower arm, and the blocks 79 and 81 are respectively positioned adjacent the outer edge and the intermediate portion of the companion arm. In the embodiment chosen for illustration the spaces between the blocks of the yoke 73ª are equal; but in the other yoke the space intermediate the blocks 80 and 82 is twice that of the others. This arrangement permits the shifting-cam, in neutral position, to pass the blocks 81 and 82. If the spaces were all equal and the shifting-cam were positioned between the yokes when it is adjusted to shift the gears to neutral position, an undesirable arrangement of the selector quadrant would result, inasmuch as the neutral indication would fall between L and I.

Fig. 4 shows the cam-shaft in position to shift the gears to neutral. As the selector lever is moved to indicate reverse, the selector-plate, 48 will be drawn forwardly and co-act with the swivel 50 in sliding the cam-shaft to aline the shifting-cam 69 with the block 81 of yoke 73, and the cam 68 will register with blocks 80 and 81 of the companion yoke. As the foot-lever 34 is depressed, the first movement causes the cam 37 to actuate the arm 38 and thus disengage the engine clutch. During this portion of the path of movement of the lever, the gear-shifting mechanism is not actuated because of the lost-motion connection between these parts.

Further movement of the lever 34 operates to rotate the shaft 28 and the cam mechanism. If either of the movable gear wheels 17 is in a shifted position, it will return to neutral position either by the neutralizing cam 68 or by the shifting cam 69 as it shifts the yoke 73 forwardly to actuate the arm 19 and the corresponding gear wheel 17 into operative position for reversing the direction of drive.

When the operator releases the lever 34, the spring 41 returns the shaft 28 to its normal position with the stop 43 in engagement with the bracket 44. The spring 40 returns the lever 34 to its inoperative position.

Thus, in selecting low gear, the selector-lever is moved to L and the shifting-cam thereby alined with the block 82 to shift the same yoke in the opposite direction.

The other ratios are chosen in the other yoke in like manner, the shifting-cam engaging the blocks 82 and 81 in shifting to intermediate and high gears, respectively.

Obviously, the number of yokes and cams may be altered to accommodate any number of speeds with which a car may be provided.

Having thus described my invention what I claim as new and desire to secure by Letters Patent, is,—

1. In a gear-shifting mechanism, the combination with a pair of shiftable gear wheels and a pair of movable members connected thereto, each of said movable members having a side portion that is provided with a plurality of cam faces, of a longitudinally movable element having a series of cam portions for coacting with said cam faces to shift the one or the other of said gear wheels according to the longitudinal position of said element.

2. In a gear-shifting mechanism, the combination with a pair of shiftable gear wheels and a pair of movable members connected thereto, each of said movable members having a side portion that is provided with a plurality of substantially parallel cam faces offset from each other, of a rod having a plurality of cam portions of varying radii for coacting with said cam faces to shift the one or the other of said gear wheels.

3. In a gear-shifting mechanism, the combination with a pair of shiftable gear wheels, and a pair of members of approximately U-shape connected to said gear wheels, each of said members being provided with a plurality of cam surfaces upon each side portion, of an element movable transversely to said members having coacting cam surfaces for returning a shifted gear wheel to its neutral position and to shift one of the gear wheels to an operative position upon a continuous movement of said element.

4. In gear-shifting mechanism, the combination with transmission mechanism having a plurality of gear-shifting elements, each movable between neutral and operative positions on opposite sides of neutral, of a rock-shaft, radial arms of varying lengths carried thereby and each extending on opposite sides of the rock-shaft, members movable in opposite directions laterally to the rock-shaft and to positions corresponding to said neutral and operative positions for the control of said elements, each of said members embodying interconnected companion bars, disposed on opposite sides of the rock shaft and longitudinally to their direction of travel, and a plurality of projections on the adjacent sides of each bar and each arranged oppositely to those of the companion bar, one of said projections on one bar being engageable, at selected times, by one end of the longer of said arms to move the member to one operative position, and the corresponding projection of the opposite bar being engageable, at selected times, by the opposite end of said longer arm to move the member to its other operative position, and the others of said projections being engageable by the shorter of said arms to move the member to neutral position, means for placing said arms in engagement with any selected ones of said projections, and means for actuating the rock-shaft.

5. In gear-shifting mechanism, the combination with transmission mechanism having a plurality of gear-shifting elements, each movable between neutral and operative positions on opposite sides of neutral, of a rock-shaft, radial arms of varying lengths carried thereby and each extending on opposite sides of the rock-shaft, members movable in opposite directions laterally to the rock-shaft and to positions corresponding to said neutral and operative positions for the control of said elements, each of said members embodying interconnected companion bars, disposed on opposite sides of the rock-shaft and longitudinally to their direction of travel, and a plurality of projections on the adjacent sides of the bars, and each arranged oppositely to those of the companion bar, one of said projections on one bar being engageable, at selected times, by one end of the longer of said arms to move the member to one operative position, and the corresponding projection of the opposite bar being engageable, at selected times, by the opposite end of said longer arm to move the member to its other operative position, and the others of said projections being engageable by the shorter of said arms to move the member to neutral position, said arms and projections being so related that the shorter of said arms will be in a position to move one of said members to neutral prior to movement by the longer of said arms of another of said members to an operative position, means for placing said arms in engagement with any selected ones of said projections, and means for actuating the rock-shaft.

6. In gear-shifting mechanism for motor-vehicles, the combination with transmission mechanism having a plurality of gear-shifting elements, each movable between neutral and operative positions on opposite sides of neutral, of a rock-shaft, cams of varying radii carried thereby, yokes movable laterally to the rock-shaft to positions corresponding to said neutral and operative positions for the control of said elements, and having engageable parts disposed on opposite sides of the rock-shaft, the parts on one side of the rock-shaft being engageable by the cams to move the yokes in one direction and the parts on the opposite side of the rock-shaft being engageable to move the yokes in the opposite direction, the greater of said cams being adapted to engage and coöperate with any selected ones of said parts to move any selected one of said yokes to an operative position, and the smaller of said cams being adapted to engage said parts to move any yoke to neutral position prior to movement of a yoke selected to be moved to an operative position, means for actuating the rock-shaft, and means for placing said cams and any selected ones of said parts in coöperative relation.

7. In gear-shifting mechanism for motor-vehicles, the combination with transmission mechanism having a plurality of gear-shifting elements, each movable between neutral and operative positions on opposite sides of neutral, of members each movable to opposite points and an intermediate point for the control of said elements, each opposite point corresponding with a different operative position, and the intermediate point corresponding to neutral position, said members having parts engageable to move the members in either direction, a turning element having radial arms of varying lengths engageable with said parts, the longer of said arms being engageable with certain of the said parts of any chosen one of said members to move the chosen member to one of its opposite points, and engageable with certain other of said parts to move the chosen member to its other opposite point, and the shorter of said radial arms being engageable with said parts to move any one of said members to its intermediate point prior to the movement of a chosen member to one of its opposite points, means for actuating the turning element, and means for placing the radial arms and selected ones of said parts in mutual engagement.

In testimony whereof I have hereunto set my hand in presence of two subscribing witnesses.

BURTON A. WALRATH.

Witnesses:
　CARL S. SPALDING,
　BURTON W. NORTON.